Oct. 31, 1961  R. K. BAILEY  3,006,321
POULTRY FEEDING TROUGHS
Filed Nov. 25, 1959
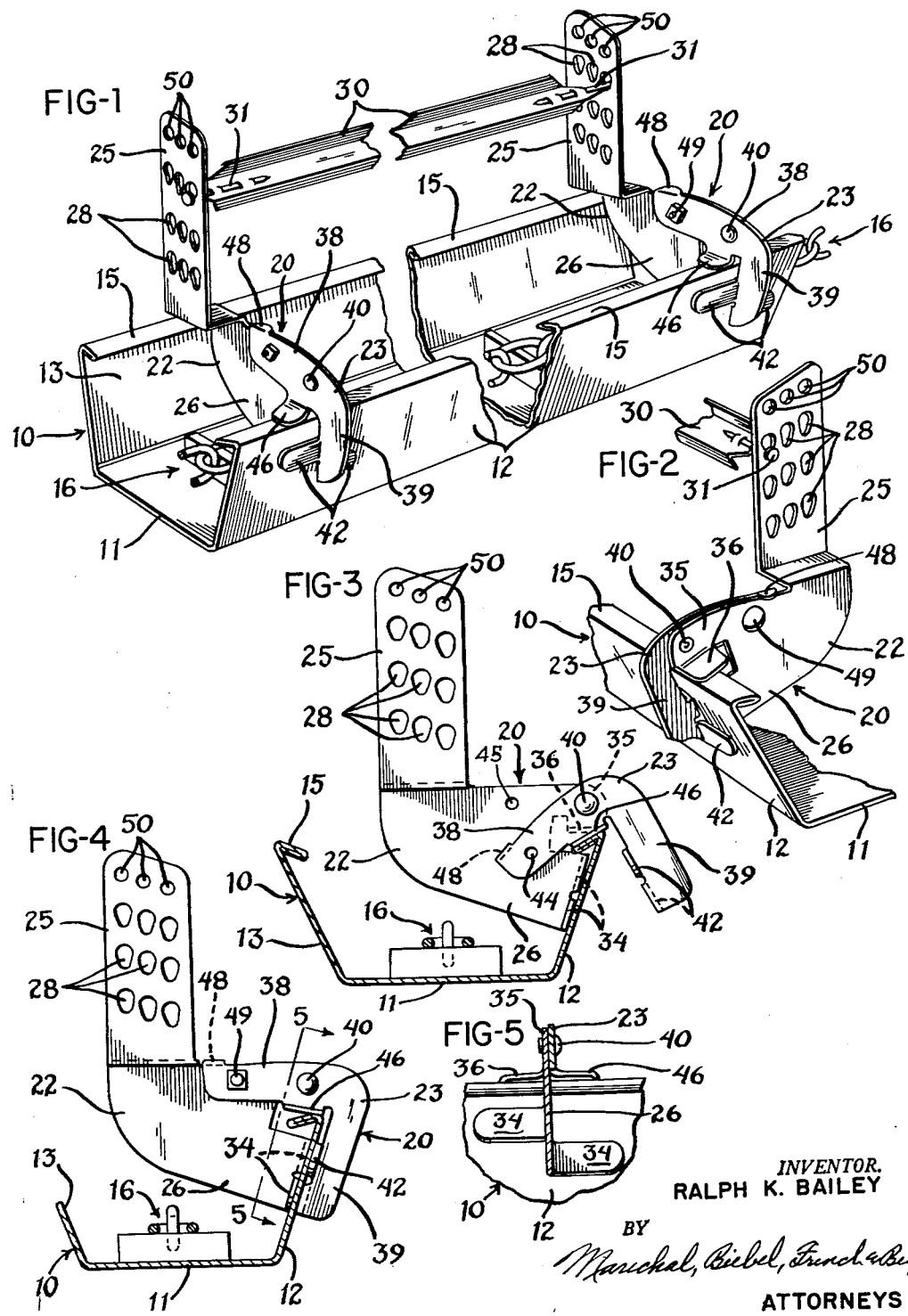
INVENTOR.
RALPH K. BAILEY
BY
Marechal, Biebel, French & Bugg
ATTORNEYS

United States Patent Office 3,006,321  
Patented Oct. 31, 1961

3,006,321  
POULTRY FEEDING TROUGHS  
Ralph K. Bailey, Springfield, Ohio, assignor to The Buckeye Incubator Company, Springfield, Ohio, a corporation of Delaware  
Filed Nov. 25, 1959, Ser. No. 855,304  
5 Claims. (Cl. 119—61)

This invention relates to poultry feeding and watering troughs, and more particularly to a support clamp for use in combination with such troughs.

This invention provides a removable clamp for application to one side of a poultry feeding or watering trough. Such a trough may be for use for the hand feeding or watering of poultry but more usually is a part of a mechanical system, such as is shown in the copending application of Bailey, Serial No. 752,689, filed August 4, 1958, entitled Feed Conveyor. The clamp of this invention is characterized by its versatility and adaptability to a wide variety of troughs of different widths and heights, such as are used for the feeding and watering of chicks, layers, turkeys, etc. It provides support for a rotatable reel mounted over the open side of the trough to discourage perching above or scratching within the trough, and it is also suitable as a hanger for supporting the trough above the ground. It is arranged for the ready insertion and removal of a feed conveyor or chain without the necessity of disturbing the clamp on the trough. The clamp of this invention provides a positive clamping action when in position on the side of the trough and incorporates a positive catch or latch for securing the relatively moving clamping parts in a clamped position.

It is a principal object of this invention to provide a versatile trough support clamp as outlined above for fixture to a trough for the adjustable support of a reel.

It is a further object of this invention to provide a clamp as outlined above characterized by simplicity and ruggedness.

Another object of this invention is to provide a clamp as outlined above suitable for use as a hanger for the support of a trough above the floor or ground and having particular utility for use with the troughs of mechanized feeder systems.

Other objects and advantages of the invention will be apparent from the following description, the accompanying drawing and the appended claims.

In the drawing—

FIG. 1 is a perspective view of a pair of the clamps of this invention as applied in spaced apart relation to the side of a poultry feeding trough;

FIG. 2 is a perspective view of one of the clamps of FIG. 1 from the other side;

FIG. 3 is an elevational view of the clamp showing one of the clamping members in the open position;

FIG. 4 is a view similar to FIG. 3 showing the closed position of the clamp; and FIG. 5 is a sectional view of the clamp taken generally along lines 5—5 of FIG. 4.

Referring to the drawing, which illustrates a preferred embodiment of the invention, a feeding trough is indicated generally at 10 as having a flat bottom 11 and a pair of diverging upstanding sides 12 and 13. Each of the sides 12 and 13 is terminated in a turned over lip 15 which serves to conserve the feed by preventing spillage. A feed conveyor chain 16 is shown as extended through the trough 10 adjacent the bottom 11 when the trough 10 is used with a mechanical feeder. The chain 16 may be driven mechanically to draw feed from a hopper and to distribute the feed along the length of the trough in the manner described in the above-referenced copending application.

The support clamp of the invention is indicated generally at 20 and includes an inner clamping member 22 and an outer clamping member 23, both of which may be conveniently fabricated from sheet metal. The inner clamping member 22 is formed with an upwardly extending support portion 25 arranged to overlie the center of the trough by an integral inwardly extending bottom clamping portion 26. Means in the support portion 25 for supporting a reel include a plurality of generally tear dropped openings 28 arranged in vertical and horizontal rows to provide for the adjustable support of a reel indicated at 30.

The reel 30 may be of any convenient configuration to serve the purpose of keeping the birds out of the feeding trough, and the Z-shaped reel 30 shown is of particular utility since it also discourages the fowls from perching above the trough. Pins 31 extend from opposite ends of the reel 30 for insertion within one of the openings 28 for rotatably supporting the reel 30 in any one of the selectable positions provided by the openings 28, as desired, according to the width of the trough 10 and the size of the birds feeding therein.

Means on the bottom clamping portion 26 arranged for engagement with the inside surface of the wall 22 include a pair of oppositely diverging, longitudinally extending trough engaging fingers 34, as shown in FIG. 5. A hinge tab 35 is also formed on the bottom clamping portion 26 of the inner member 22 and is arranged to extend above and adjacent the feeding trough rim 15. A flap 36 is formed on said lower portion 26 adjacent the hinge tab 35 and is arranged to engage the upper surface of the rim 15 for the support of the clamp on the rim.

The outer clamping member 12 is generally L-shaped in configuration and includes integral top and bottom legs 38 and 39. The outer clamping member 23 is pivotally movable on the inner member 22 at the hinge tab 35 by a rivet 40 between an open released position (FIG. 3) and a closed clamped position (FIG. 4). The bottom leg 39 is provided with means arranged for movement against and engagement with the outside surface of the wall 12 in the closed position of the clamp 20, including a pair of longitudinally extending, oppositely diverging fingers 42, similar to the fingers 34 of the inner member 22.

The top leg 38 of the outer member 23 is movable adjacent the bottom portion 26 of the inner member 22 and includes an indexing opening 44. In the closed position of the clamp shown in FIG. 4, the opening 44 is in alignment with a mating opening 45 formed in the bottom portion 26. The top leg 44 includes means forming a second flap 46 formed to engage the upper surface of the rim 15 in the closed position of the clamp, and extending longitudinally of the trough 10 in diverging relation to the flap 36 on the inner member 22. The top leg 44 is further provided with a tongue or lip 48 which is engageable over the upper edge of the bottom portion 26 in the closed position of the clamp to lock the inner and outer members in the clamped position. If desired, a bolt 49 may be inserted through the holes 44, 45 to secure the clamp in the closed position.

The arrangement of the components of this invention provides a firm grip on the trough 10. Accordingly, the clamp 20 may be used as a hanger for the overhead support of the trough above the floor or the ground. To this end, overhead support means in the form of holes 50 are formed in the upper portion 25 above the reel openings 28 for suitable connection to overhead supporting wires, frames or the like. A plurality of the holes 50 are formed in a transverse longitudinal row providing a selection for balancing the trough 10 in the supported position.

The operation of this invention is largely evident from the foregoing description. In attaching the clamps 20 to the trough 10, the members 22 and 23 are opened to the position shown in FIG. 3, and the clamp is lowered over one of the trough sides 12—13. The clamp members 22 and 23 are then brought to the closed position. In this position the fingers 42 on the outer member 23 and the fingers 34 on the inner member 22 are compressed against the sides of the wall in frictional engagement therewith. Accordingly, a suitable prying lever, such as an ice pick, may be inserted from the opening 44 into the opening 45 to assist in bringing these openings into alignment with each other and to bring the lip 48 into its locking position over the upper edge of the lower portion 26. The spaced apart distance of a pair of the clamps 20 is adjusted so that the pins 31 of the reel 30 are receivable within an opposite pair of the openings 28. In this manner, the reel 30 may be adjusted to be centered over the trough, and the height of the reel 30 above the trough may be varied by the selection of suitable ones of the openings 28. The clamp 20, being secured to one side only of the trough 10, provides for the unrestricted insertion and removal of the feed chain 16, as desired.

It is therefore seen that this invention provides a trough support clamp which is readily adaptable to troughs of differing dimensions for the adjustable support of a reel and, if desired, for the overhead support of the trough above the ground.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A support clamp connected to one side wall of a feeding and watering trough, comprising an inner clamping member having an upwardly extending support portion arranged in overlying relation to said trough and an inwardly extending integral bottom clamping portion, means in said support portion for the adjustable support of one end of a reel, said bottom clamping portion having means arranged for engagement with the inside surface of said one side wall, a generally L-shaped outer clamping member pivotally movable on said inner member between an open position and a closed clamped position and having a bottom leg provided with means arranged for engagement with the outside surface of such wall in said closed position, said outer member further having a top leg movable adjacent said inner member and provided with lock means engageable with said bottom portion to secure said inner and outer member in said closed clamped position on the trough.

2. An overhead support clamp connected to one side wall of a feeding and watering trough with an inwardly turned rim, comprising an inner clamping member having an upwardly extending support portion arranged in overlying relation to said trough and connectable to an overhead trough support and an integral inwardly extending bottom clamping portion, said bottom clamping portion having means arranged for engagement with the inside surface of said one wall below said rim, a generally L-shaped outer clamping member pivotally movable above said rim on said inner member between an open position and a closed clamped position and having a bottom leg provided with means arranged for engagement with the outside surface of such wall in said closed position, said outer member further having a top leg movable adjacent said inner member and provided with lock means engageable with said bottom portion to secure said inner and outer members in said closed clamped position on the trough.

3. A support clamp in combination with feeding and watering troughs, comprising an inner clamping member having an upwardly extending support portion and an integral bottom clamping portion, means in said support portion for the adjustable support of a reel, said bottom clamping portion having oppositely diverging trough engaging fingers arranged for engagement against the inside surface of the wall of the feeding trough, a generally L-shaped outer clamping member pivotally movable on said inner member between an open position and a closed clamped position and having a bottom leg with a pair of oppositely diverging trough engaging fingers arranged for movement against the outside surface of such wall in said closed position, said outer member further having a top leg movable adjacent said inner member between said open and closed positions, said top leg further having a tongue engageable over said bottom portion to lock said inner and outer members in said closed clamped position on the trough.

4. A support clamp in combination with feeding and watering troughs, comprising an inner clamping member having an upwardly extending support portion and an integral bottom clamping portion, means in said support portion forming holes for the adjustable support of a reel, said bottom clamping portion having oppositely diverging trough engaging fingers arranged for engagement against the inside surfae of the wall of the feeding trough, a first trough rim engaging flap formed on said inner member adjacent said hinge portion, a generally L-shaped outer clamping member pivotally movable on said inner member between an open position and a closed clamped position and having a bottom leg with a pair of oppositely diverging trough engaging fingers arranged for movement against the outside surface of such wall in said closed position, said outer member further having a top leg movable adjacent said inner member between said open and closed positions and provided with a second trough rim engaging flap in diverging relation to said first flap, said top leg further having means engageable to lock said inner and outer members in said closed clamped position on the trough.

5. A support clamp in combination with feeding and watering troughs, comprising an inner clamping member having an upwardly extending support portion and an integral bottom clamping portion, means in said support portion forming holes for the adjustable support of a reel, said bottom clamping portion having oppositely diverging trough engaging fingers arranged for engagement against the inside surface of the wall of the feeding trough, a hinge tab formed on said inner clamping member and arranged to extend adjacent the feeding trough rim, a first trough rim engaging flap formed on said inner member adjacent said hinge portion, a generally L-shaped outer clamping member pivotally movable on said inner member at said hinge tab between an open position and a closed clamped position and having a bottom leg with a pair of oppositely diverging trough engaging fingers arranged for movement adjacent the outside surface of such wall in said closed position, said outer member further having a top leg movable adjacent said inner member between said open and closed positions and provided with a second trough rim engaging flap in diverging relation to said first flap, said top leg further having a tongue engageable over said bottom portion to lock said inner and outer members in said closed clamped position on the trough.

References Cited in the file of this patent

UNITED STATES PATENTS

| 934,676 | Langslow | Sept. 21, 1909 |
| 2,708,557 | Clark | May 17, 1955 |
| 2,865,328 | Hostetler | Dec. 23, 1958 |